United States Patent [19]
Kettler

[11] 3,732,485
[45] May 8, 1973

[54] ELECTRICAL APPARATUS HAVING INVERSE PARALLEL CONNECTED PAIRS OF THYRISTORS

[75] Inventor: Clarence J. Kettler, Becket, Mass.

[73] Assignee: General Electric Company

[22] Filed: Dec. 29, 1971

[21] Appl. No.: 213,334

[52] U.S. Cl. ................323/43.5 S, 323/45, 323/62
[51] Int. Cl. .................................................G05f 1/30
[58] Field of Search.....................323/625, 43.5 S, 323/45, 62

[56] References Cited

UNITED STATES PATENTS

| 3,600,664 | 8/1971 | Goldberg et al. | 323/43.5 S |
| 3,275,929 | 9/1966 | Schatz | 323/43.5 S |
| 3,621,375 | 11/1971 | Kettler | 323/45 |
| 3,621,374 | 11/1971 | Kettler | 323/43.5 S |

Primary Examiner—A. D. Pellinen
Attorney—Francis X. Doyle et al.

[57] ABSTRACT

Voltage regulator apparatus for an alternating current electrical system which includes a secondary of a transformer connected in series with the line. A voltage of either polarity or no voltage is applied to the primary of the transformer through a plurality of pairs of inverse parallel connected thyristors. The thyristors are gated in such an order so as to assure commutation of any prior conducting thyristor.

2 Claims, 5 Drawing Figures

Inventor,
Clarence J. Kettler,
by Francis K. Doyle
His Attorney.

Inventor,
Clarence J. Kettler,
by Francis X. Doyle
His Attorney.

ELECTRICAL APPARATUS HAVING INVERSE PARALLEL CONNECTED PAIRS OF THYRISTORS

BACKGROUND OF THE INVENTION

1. Field of the Invention

This invention relates to voltage regulators used for regulating voltage in alternating current electrical systems. More particularly, it relates to voltage regulators which utilize phase controlled thyristor switching devices to supply a voltage which bucks, boosts, or leaves unchanged the line, or supply, voltage to the regulator so as to maintain a steady output voltage level in spite of variations in the line, or supply voltage.

At present, the cost of high current carrying thyristors or controlled rectifiers is relatively high. A thyristor or controlled rectifier connected directly in the line supply voltage would require a relatively high current rating to supply medium power ratings of up to approximately 800 KVA at low commercial voltages in the range of 120 to 480 volts. Therefore, it is highly desirable to have a simple, efficient, and economical voltage regulator system in which the thyristors or controlled rectifiers need not be capable of carrying full line or load current.

2. Description of the Prior Art

Voltage regulators are known in the prior art in which a secondary winding of a transformer is connected in series with the AC line. The primary winding of this transformer is connected to a source of unregulated voltage and gated, bilateral semiconductor switches are provided to selectively connect such primary to provide bucking or boosting voltage increments to the secondary.

SUMMARY OF THE INVENTION

Briefly, the present invention is an alternating current regulator system in which a secondary winding of a transformer is connected in series with the line and load circuits. Various magnitudes and polarities of the alternating voltage or potential will be applied to the primary winding of the transformer from a tapped supply transformer by selection of one or more of a plurality of pairs of inverse parallel connected thyristors or controlled rectifiers, connected to the taps.

In one embodiment, a permanent buck is provided by the connection of a portion of the supply transformer in an autotransformer connection in series with the line lead and the secondary winding. Two levels of boost are provided by two sets (pairs) of inverse parallel connected thyristors, while a third set (pair) of thyristors serves to provide a zero boost connection. In a second embodiment, a plurality of magnitudes of alternating potential may be selected through any one of a plurality of sets of thyristors to be applied to the primary of the transformer through one of two other sets of thyristors which will determine whether the regulator operates in a buck or a boost mode. In a third embodiment, various degrees of buck or boost are provided by triggering various combinations of sets of thyristors in order to provide current flow through various tapped portions of the primary winding of the transformer in the desired boost or buck direction.

In these embodiments, triggering of the thyristor is always in the order or sequence from a set of thyristors connected to a lower potential to a set of thyristors connected to a higher potential in order to provide automatic commutation of any previously conducting thyristor. The use of thyristors, copper, and iron in the regulator is optimized because the thyristors need not be capable of carrying full load current, but need only be rated for a current depending upon the degree of regulation required. Furthermore, the requirements for copper and iron are minimized because the primary winding of the transformer need not be rated to carry load current.

BRIEF DESCRIPTION OF THE DRAWINGS

While the specification concludes with claims particularly pointing out and distinctly claiming the subject matter which is regarded as the invention, it is believed this invention will be better understood from the following description of preferred embodiments taken in connection with the accompanying drawings, in which:

DESCRIPTION OF THE PREFERRED EMBODIMENTS

Figure 1:
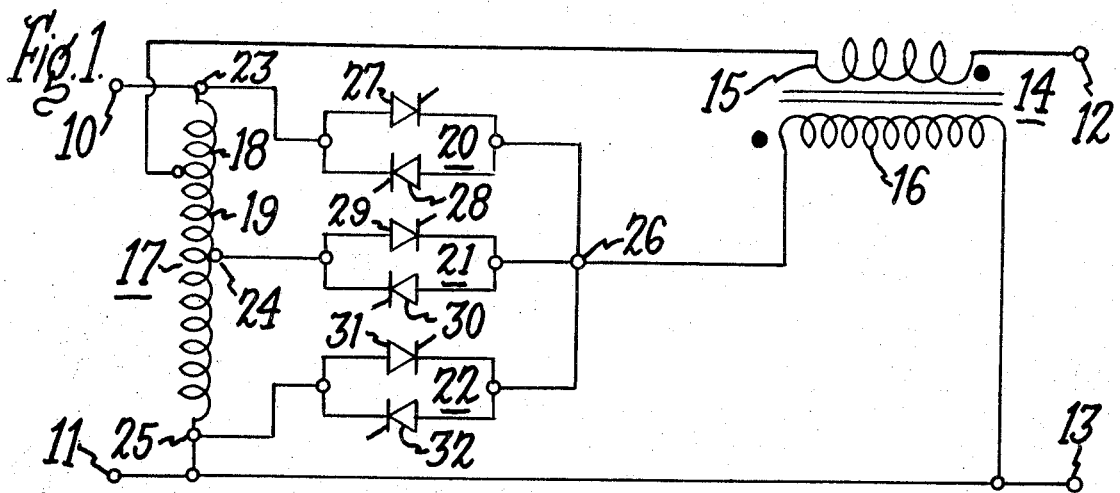
FIGS. 1, 2, and 3 are schematic diagrams illustrating various embodiments of regulator switching arrangements constructed in accordance with the teachings of the invention.

Referring now to the drawings, and more particularly to FIG. 1, there is shown a schematic diagram of a regulator switching arrangement in accordance with the teachings of the invention. The circuitry for triggering the thyristors or controlled rectifiers is not shown since they are well known in this art and form no part of this invention.

In FIG. 1, terminals 10 and 11 are input terminals across which an unregulated source of alternating voltage is applied. The load requiring a regulated alternating voltage is connected across terminals 12 and 13. The secondary winding 15, of transformer 14, is connected in series with the line between terminals 10 and 12.

Also connected in series with secondary winding 15 and the line between terminals 10 and 12 is a permanent bucking winding portion 18, of shunt or supply transformer 17. Shunt transformer 17, composed of windings 18 and 19 connected in series, is connected across the input terminals 10 and 11. One side of each of three sets of inverse parallel connected thyristors or controlled rectifiers 20, 21, and 22 is connected respectively to taps 23, 24 and 25 on shunt transformer 17. The other sides of the thyristor sets 20, 21 and 22 are connected together at point 26 which is in turn connected to one end of the primary windings 16 of transformer 14. The other end of primary winding transformer 16 is connected to a common terminal or point which may be terminals 11 or 13. Each set of thyristors 20, 21 and 22 comprise a pair of inverse parallel connected thyristors as mentioned above. Thyristor set 20 is comprised of thyristor 27 and thyristor 28 connected in inverse parallel relationship. Thyristor set 21 is comprised of thyristors 29 and 30 connected in inverse parallel relationship. Thyristor set 22 is comprised of thyristors 31 and 32 connected in inverse parallel relationship.

In operation of the embodiment of FIG. 1, an alternating voltage is applied across terminals 10 and 11. The thyristor sets 20-22 are always fired or triggered in each half cycle. The firing is in the order from the set having the smallest potential across it to the set having the largest potential across it. For example, suppose maximum boost were required on the positive half cycle of the input voltage applied across terminals 10 and 11. This would require the generating of a potential across the secondary winding 15 having the dotted terminal going positive. This would require a positive current flow into the dotted terminal of primary winding 16. In order to accomplish this maximum boost, gating pulses in rapid sequence would be applied to the gate terminals of thyristors 31, 29 and then 27. This would cause thyristor 27 to start to conduct very early in the positive going half cycle. It is noted that the turning on or triggering of thyristor 27 causes a larger potential at point 26 than that at point 24, and therefore causes thyristor 29 to be commutated and turned off.

Figure 4A:
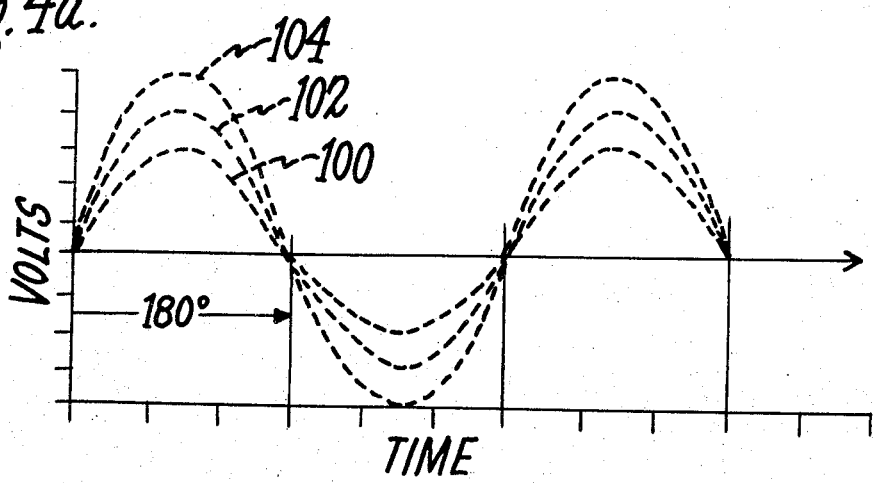
FIGS. 4a and 4b are drawings of various electrical wave forms used in describing the operation of the circuit of this invention.
Figure 4B:
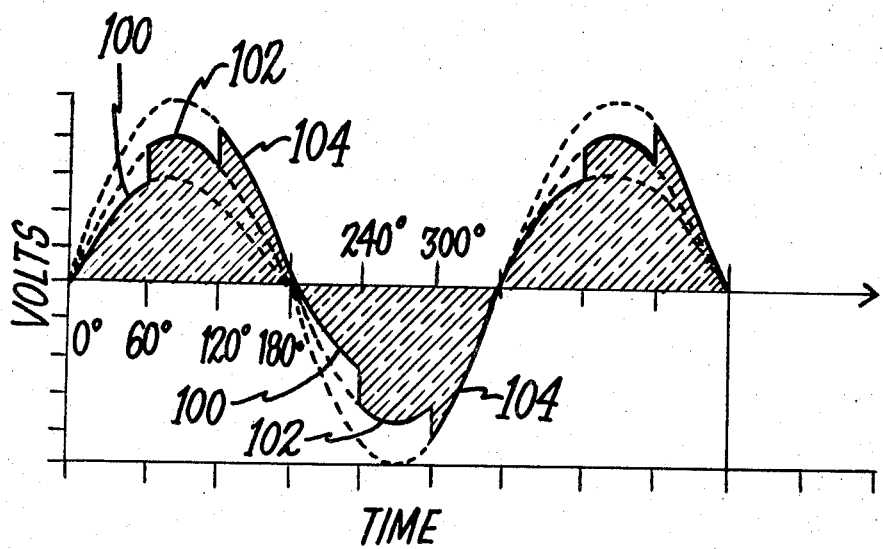

Referring now to FIGS. 4a and 4b, various typical waveforms are shown at selected points in the circuit of FIG. 1, for a clearer description of the operation of the circuit. The wave forms are shown with the horizontal or abscissa representing time and the vertical or ordinate representing voltage, as shown. FIG. 4a and 4b represent the output voltage under various conducting conditions of the thyristors of FIG. 1. It will, of course, be understood that the various voltage levels are exaggerated for the purpose of illustration.

Considering first FIG. 4a, three sine wave forms are shown. Wave form 100 may be considered as representing the output voltage, when no buck or boost is applied to the circuit of FIG. 1, other than the permanent buck applied by winding portion 18. Wave form 100 would be generated if the proper thyristor of thyristor set 22 were triggered for each half cycle of the input voltage. The wave form 102 represents the output voltage when only a partial boost is applied to transformer 14. As will be understood, wave forms 102 would be generated if the proper thyristor of the thyristor set 21 were triggered for each half cycle of the input voltage. Wave form 104 represents the output voltage when full boost is applied to transformer 14. As will be understood, the full boost is generated when the proper thyristor of thyristor set 20 is triggered for each half cycle of the input voltage.

The solid line wave form of FIG. 4b represents the output voltage of FIG. 1 when the proper thyristor of each of thyristor sets 22, 21 and 20 are triggered sequentially, 60° apart. As previously discussed, the thyristor sets are always triggered sequentially, starting at the set having the lowest potential across it. As can be seen from FIG. 4b, at 0° the proper thyristor of set 22 is triggered, providing the output voltage indicated by curve 100, shown in solid line in FIG. 4b. Approximately 60° later the proper thyristor of thyristor set 21 is triggered, providing the output voltage indicated by the solid curve 102 of FIG. 4b. Then, at approximately 120° (60° later) the proper thyristor of thyristor set 20 is triggered, providing the output voltage indicated by the solid curve 104 of FIG. 4b. At 180°, the proper thyristor of thyristor set 22 is again triggered providing the voltage output indicated by the solid curve 100 below the line. Again at 240°, the proper thyristor of set 21 will be triggered to provide the output voltage indicated by solid curve 102 below the line, while at 300° the proper thyristor of thyristor set 20 will be triggered to provide the output voltage indicated by solid curve 104 below the line. As will be clear from the above discussion, the gating or triggering times of thyristor sets 21 and 20 may be advanced in successive conduction intervals to increase the total boosting interval, to provide an increase in the average load voltage. At one extreme of circuit operation only thyristor set 22 may be triggered, while at the opposite extreme thyristor set 20 may be triggered so early as to mask the fact that thyristor sets 22 and 21 are also being triggered. It will be apparent as this description continues that similar operations are provided by the other embodiments of the circuits of this invention.

Figure 2:
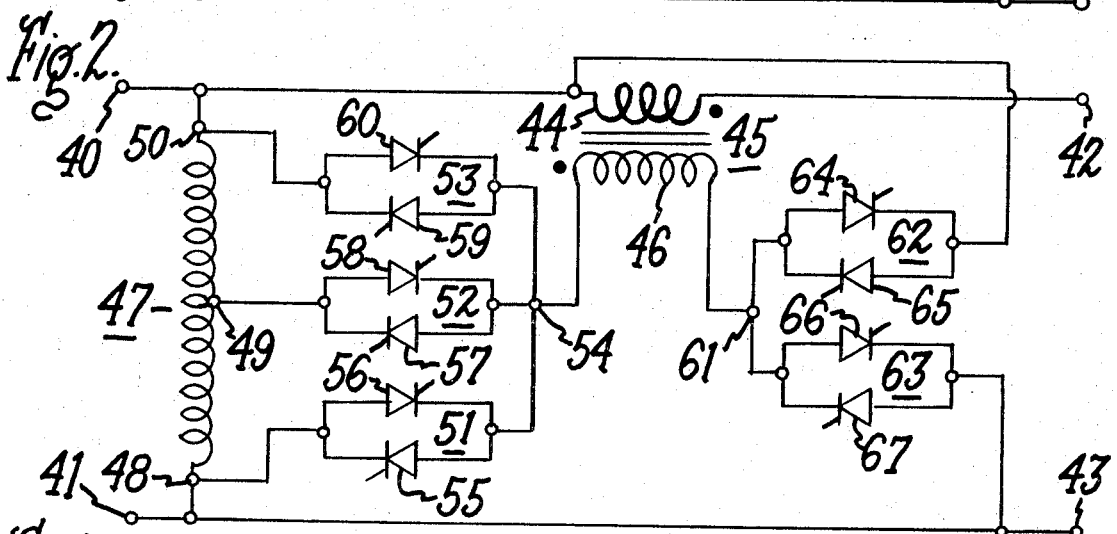

Now referring to FIG. 2 there is shown another embodiment of the invention in which two levels, of buck, a zero level, and two levels of boost are provided by five sets of inverse parallel connected thyristors and a shunt transformer. Three of the sets of thyristors are connected to taps on a shunt transformer and the other two sets of thyristors are used in selecting a buck or boost mode of operation.

In FIG. 2, a source of alternating voltage is applied across terminals 40 and 41, and the output load requiring the regulated voltage is connected across terminals 42 and 43. The secondary winding 44 of transformer 45 is connected in the line between terminals 40 and 42. Shunt transformer 47 having taps 48, 49 and 50 is connected across input terminals 40 and 41. One side of each set of inverse parallel connected thyristors 51, 52, and 53 is connected respectively to the taps 48, 49 and 50. The other sides of thyristor sets 51–53 are tied together at point 54. Each set of thyristors 51–53 is composed of a pair of inverse parallel connected thyristors with set 51 containing thyristors 55 and 56, set 52 containing thyristors 57 and 58, and set 53 containing thyristors 59 and 60. The junction or point 54 of thyristor sets 51–53 is connected to one side of primary winding 46 of transformer 45. The other side of primary winding 46 is connected to the junction point 61 of thyristor sets 62 and 63. Thyristor set 62 is composed of inverse parallel connected thyristors 64 and 65, and is in turn connected to the input line connected to terminal 40. Thyristor set 63 is composed of thyristors 66 and 67, and is in turn connected to the common line connected to terminals 41.

The operation of an embodiment of the invention illustrated as FIG. 2 will be described for both a boost and a buck mode of operation for a positive half cycle of input voltage. With the conventional dot coded terminals of transformer 45 which indicate like polarities, for a positive half cycle of input voltage, a positive current would be required to flow into the dotted terminal of primary winding 46 of transformer 45 in order to produce a boost mode of operation. A positive current flow out of the dotted terminal of primary winding 46 would cause a buck mode of operation.

In a boost mode of operation, one of the thyristors of thyristor set 63 would be gated on. In this case, for a positive half cycle of input voltage, thyristor 66 would be gated on. In addition, one or more of the thyristors in thyristor sets 51–53 would be gated on at various times during the half cycle in order to provide the desired amount of boost to the output voltage. The order of firing of thyristor sets 51-53 in the boost mode of operation would be from set 51 to set 53 in order to provide automatic commutation of any prior conducting thyristor. In particular, for a positive half cycle of the applied voltage in the boost mode of operation, the order of firing would be thyristor 56, thyristor 58, and then thyristor 60. For a zero amount of boost, only thyristor 56 would be fired. The firing of thyristor 56 would not apply any potential across primary winding 46. If a medium amount of boost were required, thyristor 56 would be fired very early in the half cycle, and then thyristor 58 would be fired at some later time during the half cycle depending upon the exact amount of boost required. If the maximum amount of boost were required, thyristors 56, 58 and 60 would be fired in that order, very early in the cycle. The firing of thyristor 60 early in the cycle would place the voltage across shunt transformer 47 across the primary winding 46 of transformer 45 in such a polarity as to require positive current to flow into the dotted terminal of primary winding 46. The firing of thyristor 60 after thyristor 58 had been fired would automatically commutate thyristor 58 since the firing of thyristor 60 would place the potential at tap 50 of transformer 47 on the cathode terminal of thyristor 58. The potential at tap 50 of transformer 47 is greater than the potential at tap 49 of shunt transformer 47 during a positive half cycle and therefore would automatically commutate thyristor 58. In a similar manner, the firing of thyristor 58 would have previously commutated thyristor 56.

In the buck mode of operation, one of the thyristors of thyristor set 62 would be gated on. For a positive half cycle of applied voltage in the buck mode of operation, thyristor 64 of thyristor set 62 would be gated on. In addition, one or more of the thyristors of thyristor sets 51-53 would be gated on in the order of from set 53 to set 51 in order to provide commutation of any prior conducting thyristor. During a positive half cycle for zero buck, thyristor 59 would be gated on as this would apply a zero potential across the primary winding 46 of transformer 45. For varying degrees of buck, thyristors 59, 57 and 55 may be gated on at various times during the half cycle in order to provide the amount of buck required. In particular, the firing order on a positive half cycle for the buck mode of operation would by thyristor 59, thyristor 57, and then thyristor 55. It is noted that the firing of thyristor 57 after thyristor 59 had been conducting would automatically commutate thyristor 59. Similarly, the firing of thyristor 55 after thyristor 57 had been conducting would automatically commutate thyristor 57. It is noted that each of these thyristors can be fired in each half cycle, that is for example, thyristor 59 may be fired at zero degrees, thyristor 57 fired at 30°, and thyristor 55 fired at 90° in order to provide the exact amount of buck required.

Figure 3:
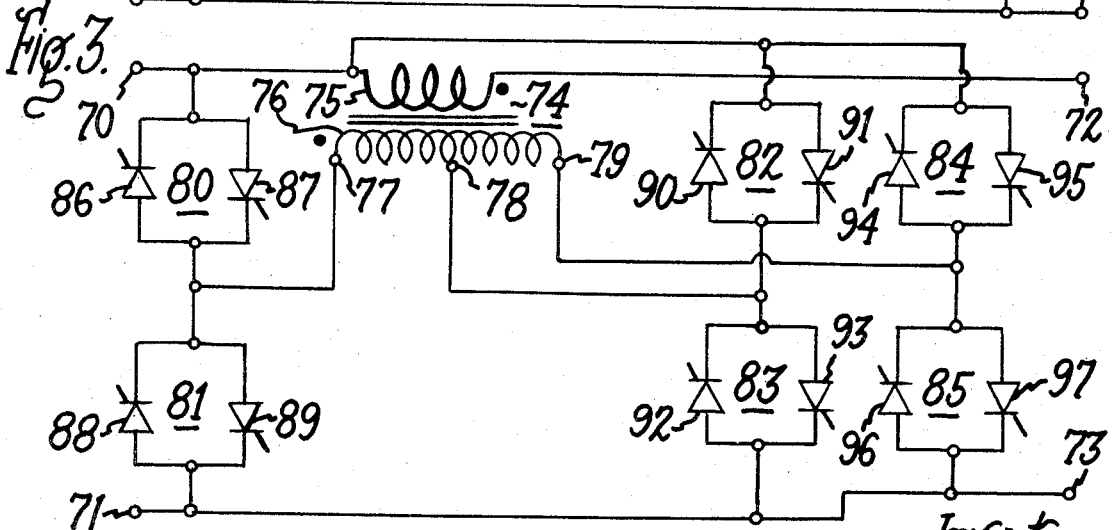

Referring now to FIG. 3, there is shown another embodiment of the invention in which an input alternating voltage is applied across terminals 70 and 71. The load requiring the regulated output voltage is connected across terminals 72 and 73. The embodiment of FIG. 3 eliminates the need for a shunt transformer, as can be seen. Secondary winding 75 of transformer 74 is connected in series with the line between terminals 70 and 72. Primary winding 76 of transformer 74 has taps or connections 77, 78 and 79. Series connected sets of thyristors 80 and 81, 82 and 83, and 84 and 85 are connected across the input terminals 70 and 71. The junction of thyristor set 80 composed of thyristors 86 and 87 and thyristor set 81 composed of thyristors 88 and 89 is connected to terminal or tap 77 of primary winding 76. Tap 78, which may be a center tap, of primary winding 76 is connected to the junction of thyristor set 82 composed of thyristors 90 and 91 and thyristor set 83 composed of thyristors 92 and 93. Terminal or tap 79 of primary winding 76 is connected to the junction of thyristor 84 composed of thyristors 94 nd 95 and thyristor set 85 composed of thyristors 96 and 97.

In operation, the embodiment of FIG. 3 provides two levels of buck, a zero level and two levels of boost by means of six sets of inverse parallel connected thyristors. The voltage output between these levels is made continuously variable by controlling the phase angle of firing of the thyristors. Boost mode of operation is obtained by firing one of the thyristors in thyristor set 80 and one of the thyristors in set 83 and 85 depending upon the level of boost required. Firing of a thyristor in 83 would provide a higher level of boost than that obtained by firing thyristor in thyristor set 85 due to the step-up effect of transformer 74. That is, when one of the thyristors of thyristor set 83 is fired, a lower effective turns ratio is achieved between the output winding 75 and the input winding 76 of transformer 74 because the energizing current flows through only a portion of the primary winding 76. On a positive half cycle for a lower level of boost, thyristors 87 and 97 would be fired at some time during the half cycle depending upon the degree of boost required. For a higher level of boost, thyristors 87 and 93 would be fired at some time during the half cycle depending upon the level of boost desired. Similarly, in a buck mode of operation for a positive half cycle thyristors 89 and 91 or 95 would be fired depending upon the desired level of buck. Of course, it will be apparent that zero boost is achieved through thyristor sets 80 and 84.

It will be apparent to those skilled in the art that the regulator circuits described herein may also be used to produce a variable output alternating voltage when a stable input alternating voltage is applied to the input terminals. It is also apparent that various changes and modifications may be made in the circuitry, or different devices used to produce the same function in the circuit. For example, other types of impedances such as resistances or capacitances may be used in certain applications in place of the shunt transformers used to develop the various alternating potentials. Also, the selection of two levels of buck and boost is not intended to limit the scope of the invention. It is apparent that a single level of buck and boost or three or more levels of buck or boost may be used by adding additional sets of thyristors and providing additional alternating potentials. The selection of the number of levels of buck or boost is merely a trade off between an acceptable level of harmonic distortion in the output voltage and the cost of the components of the circuit. For example, in FIG. 3 it is apparent that additional taps may be placed on the primary winding of the transformer 74 and associated sets of thyristors may be used to provide additional levels of buck or boost.

In view of the above, it will be apparent that modifications and variations are possible within the scope and spirit of the above teachings. It, therefore, is to be understood that within the scope of the appended claims, the invention may be practiced other than as specifically described.

What is claimed as new and desired to be secured by Letters Patent of the United States is:

1. An electrical apparatus, comprising:
   an input terminal;
   an output terminal;
   a transformer having a primary and a secondary winding, said secondary winding being connected between said input and output terminals;
   a plurality of inverse parallel connected pairs of thyristors, each of said inverse parallel connected pairs of thyristors being connected between one end of said primary winding of said transformer and one of a plurality of electrical potentials of different magnitudes in an alternating potential system;
   a pair of inverse parallel connected pairs of thyristors connected to the other end of said primary winding of said transformer, the other end of one of said pairs of inverse parallel connected pairs of thyristors being connected to an electrical potential of larger magnitude and the other end of the other of aid pair of inverse parallel connected pairs of thyristors being connected to an electrical potential of smaller magnitude.

2. An electrical apparatus, comprising:
   an input terminal;
   an output terminal;
   a transformer having a primary and a secondary winding, said secondary winding being connected between said input and output terminals;
   a first and a second pair of inverse parallel connected thyristors connected in series between said input terminal and a common point;
   a third and a fourth pair of inverse parallel connected thyristors connected in series between said input terminal and said common point, one end of said primary winding of said transformer being connected to the junction of said first and second pairs of inverse parallel connected thyristors and the other end of said primary winding being connected to the junction of said third and fourth pairs of inverse parallel connected thyristors;
   a fifth and sixth pair of inverse parallel connected thyristors connected in series between said input terminal and said common point;
   said primary winding of said transformer provided with a tap, said tap being connected to a junction of said fifth and sixth pair of inverse parallel connected thyristors connected in series between said input terminal and said common point.

* * * * *